(12) United States Patent
Shimura et al.

(10) Patent No.: US 10,974,205 B2
(45) Date of Patent: Apr. 13, 2021

(54) COMPOSITE SEMIPERMEABLE MEMBRANE

(71) Applicant: Toray Industries, Inc., Tokyo (JP)

(72) Inventors: Harutoki Shimura, Otsu (JP); Yoshie Marutani, Otsu (JP); Koji Nakatsuji, Otsu (JP); Kiyohiko Takaya, Otsu (JP); Masakazu Koiwa, Otsu (JP); Takao Sasaki, Otsu (JP); Masahiro Kimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 499 days.

(21) Appl. No.: 14/410,927

(22) PCT Filed: Jun. 27, 2013

(86) PCT No.: PCT/JP2013/067718
§ 371 (c)(1),
(2) Date: Dec. 23, 2014

(87) PCT Pub. No.: WO2014/003141
PCT Pub. Date: Jan. 3, 2014

(65) Prior Publication Data
US 2015/0190759 A1     Jul. 9, 2015

(30) Foreign Application Priority Data

Jun. 27, 2012  (JP) .............................. JP2012-143919
Aug. 31, 2012  (JP) .............................. JP2012-190730
Sep. 26, 2012  (JP) .............................. JP2012-211935

(51) Int. Cl.
*B01D 69/12*     (2006.01)
*C02F 1/44*      (2006.01)
(Continued)

(52) U.S. Cl.
CPC ......... *B01D 69/12* (2013.01); *B01D 67/0016* (2013.01); *B01D 69/02* (2013.01);
(Continued)

(58) Field of Classification Search
None
See application file for complete search history.

(56) References Cited

U.S. PATENT DOCUMENTS

| 5,811,196 A | 9/1998 | Hachisuka et al. |
| 7,364,660 B2 | 4/2008 | Takai et al. |
| 2006/0180543 A1* | 8/2006 | Kools ................ B01D 67/0009 210/490 |

FOREIGN PATENT DOCUMENTS

| CN | 1668349 | 9/2005 |
| EP | 2 695 670 | 2/2014 |

(Continued)

OTHER PUBLICATIONS

Ranarajan et al., Thin film composite reverse osmosis membrane development and scale up at CSMCRI, Bhavnagar, 282 DESALINATION 68, 71 (2011).*

(Continued)

*Primary Examiner* — Krishnan S Menon
*Assistant Examiner* — Brad Gordon
(74) *Attorney, Agent, or Firm* — DLA Piper LLP (US)

(57) ABSTRACT

A composite semipermeable membrane includes a porous supporting membrane and a separation functional layer, in which, in cross-sections having a length of 2.0 µm in a membrane surface direction, the average number density of projections in the separation functional layer which have a height of one-fifth or more of the 10-point average surface roughness is 10.0-30.0 projections/µm and the projections have an average height less than 100 nm, and in which a water production rate and a salt rejection are predetermined values or more after an aqueous solution is passed through under certain conditions.

11 Claims, 1 Drawing Sheet

(51) Int. Cl.
  *B01D 69/02* (2006.01)
  *B01D 71/56* (2006.01)
  *B01D 67/00* (2006.01)
  *C02F 103/08* (2006.01)

(52) U.S. Cl.
  CPC ........... *B01D 69/125* (2013.01); *B01D 71/56* (2013.01); *C02F 1/441* (2013.01); *B01D 2323/12* (2013.01); *B01D 2325/06* (2013.01); *B01D 2325/20* (2013.01); *C02F 2103/08* (2013.01)

(56) References Cited

FOREIGN PATENT DOCUMENTS

| | | | |
|---|---|---|---|
| EP | 2 805 761 | | 11/2014 |
| EP | 2 902 095 | | 8/2015 |
| JP | 02-078428 | A | 3/1990 |
| JP | 09-019630 | A | 1/1997 |
| JP | 09-085068 | A | 3/1997 |
| JP | 09-225273 | A | 9/1997 |
| JP | 2000-153137 | A | 6/2000 |
| JP | 2001-038155 | A | 2/2001 |
| JP | 2001-179061 | A | 7/2001 |
| JP | 2001252541 | A * | 9/2001 |
| JP | 3385824 | B2 | 1/2003 |
| JP | 2005-169332 | A | 6/2005 |
| JP | 2005169332 | A * | 6/2005 |
| JP | 2011-005455 | A | 1/2011 |

OTHER PUBLICATIONS

Ranarajan et al., Thin film composite reverse osmosis membrane development and scale up at CSMCRI, Bhavnagar, 282 DESALINATION 68, 71 (2011). (Year: 2011).*
Kim et al., Positron Annihilation Spectroscopic Evidence to Demonstrate the Flux-Enhancement Mechanism in Morphology-Controlled Thin-Film-Composite (TFC) Membrane, 39 Environ. Sci. Technol., 1764, 1764-1770 (2005). (Year: 2005).*
Supplementary European Search Report dated Feb. 25, 2016, of corresponding European Application No. 13808598.0.
Singh, S. et al., "Probing the structural variations of thin film composite RO membranes obtained by coating polyamide over polysulfone membranes of different pore dimensions," *Journal of Membrane Science*, vol. 278, No. 1-2, Jul. 5, 2006, pp. 19-25.
Kong, C., et al., "Controlled synthesis of high performance polyamide membrane with thin dense layer for water desalination," *Journal of Membrane Science*, vol. 362, No. 1-2, Oct. 15, 2010, pp. 76-80.
Ghosh, A., et al., "Impacts of support membrane structure and chemistry on polyamide-polysulfone interfacial composite membranes," *Journal of Membrane Science*, vol. 336, No. 1-2, Jul. 1, 2009, p. 140-148.
Chinese Office Action dated Oct. 23, 2015 of corresponding Chinese Application No. 201380034019.1 along with an English translation.
Communication dated Jun. 14, 2018, of corresponding European Application No. 13 808 598.0.
Notification of Reasons for Refusal dated Dec. 20, 2016, of corresponding Japanese Application No. 2013-534114, along with an English translation.

* cited by examiner

COMPOSITE SEMIPERMEABLE MEMBRANE

TECHNICAL FIELD

This disclosure relates to a composite semipermeable membrane useful for selective separation of a liquid mixture. The composite semipermeable membrane obtained is suitable, for example, for desalination of seawater or brackish water.

BACKGROUND

With respect to separation of a mixture, there are various techniques to remove substances (e.g., salts) dissolved in a solvent (e.g., water). In recent years, use of membrane separation methods is expanding for the processes with less energy and resource consumption. The membranes for use in the membrane separation methods include microfiltration membranes, ultrafiltration membranes, nanofiltration membranes, reverse osmosis membranes and the like, and these membranes are being used in obtaining potable water, for example, from seawater, brackish water, or water containing a harmful substance, and in the production of industrial ultrapure water, wastewater treatment, recovery of valuables, etc.

Most of the reverse osmosis membranes and nanofiltration membranes that are commercially available at present are composite semipermeable membranes, and there are two types of composite semipermeable membranes: one which includes a gel layer and an active layer obtained by crosslinking a polymer, the layers being disposed on a porous supporting membrane; and one which includes an active layer obtained by condensation-polymerizing monomers on a porous supporting membrane. Of these, a composite semipermeable membrane obtained by coating a porous supporting membrane with a separation functional layer constituted of a crosslinked polyamide obtained by the polycondensation reaction of a polyfunctional amine with a polyfunctional acid halide is in extensive use as a separation membrane having high water permeability and salt-removing ability.

In water production plants in which reverse osmosis membranes are used, higher water permeability is required for a further reduction in running cost. Furthermore, when a composite semipermeable membrane is used as a reverse osmosis membrane, this composite semipermeable membrane is required to retain those membrane performances even in a long-term high-pressure operation or even under such operation conditions that operation and stopping are frequently repeated and the pressure fluctuates.

Factors which affect the performance of the composite semipermeable membrane include a projection structure formed on the polyamide surface. With respect to a relationship between the membrane performance and the projection structure, a technique has been proposed in which elongated pleats are formed to thereby increase the substantial membrane area and improve water permeability (JP-A-9-19630, JP-A-9-85068 and JP-A-2001-179061). Furthermore, a method has been proposed in which a porous supporting membrane is inhibited from being densified by pressure to inhibit the composite semipermeable membrane from changing in performance during operation (Japanese Patent No. 3385824 and JP-A-2000-153137).

However, there are instances when conventional composite semipermeable membranes decrease in water permeability or salt-removing ability under such conditions that the pressure applied to the membranes fluctuates, as when operation and stopping are frequently repeated.

Consequently, it could be helpful to provide a composite semipermeable membrane which can combine high salt-removing ability and water permeability even under such conditions that the pressure fluctuates.

SUMMARY

We found that the problem can be eliminated with a composite semipermeable membrane which includes a porous supporting membrane including a substrate and a porous supporting layer and further includes a separation functional layer disposed on the porous supporting membrane and which satisfies certain requirements.

We thus provide:

<1> A composite semipermeable membrane including: a porous supporting membrane having a substrate and a porous supporting layer disposed on the substrate; and a separation functional layer disposed on the porous supporting membrane, in which, when any ten sites of cross-sections of the composite semipermeable membrane which have a length of 2.0 µm in a membrane surface direction are examined using an electron microscope, in each of the cross-sections, an average number density of projections of the separation functional layer which have a height of one-fifth or more of a 10-point average surface roughness of the separation functional layer is 10.0 to 30.0 projections/µm, and the projections have an average height of less than 100 nm, the composite semipermeable membrane has a water production rate of 1.0 m$^3$/m$^2$/day or higher and a salt rejection of 99.5% or higher after an aqueous solution having an NaCl concentration of 3.5% by weight, a temperature of 25° C., and a pH of 6.5 is passed through the composite semipermeable membrane at a pressure of 5.5 MPa for 24 hours.

<2> The composite semipermeable membrane according to <1>, in which the average number density is 13.0 to 30.0 projections/µm.

<3> The composite semipermeable membrane according to <1> or <2>, in which the projections in each of the cross-sections have a standard deviation of height of 70 nm or less.

<4> The composite semipermeable membrane according to any one of <1> to <3>, in which the porous supporting layer has a multilayer structure including a first layer disposed on a substrate side and a second layer formed thereon.

<5> The composite semipermeable membrane according to <4>, in which an interface between the first layer and the second layer has a continuous structure.

<6> The composite semipermeable membrane according to <5>, in which the porous supporting layer is formed by simultaneously applying a polymer solution A for forming the first layer and a polymer solution B for forming the second layer to the substrate, followed by contacting with a coagulation bath to cause phase separation.

<7> The composite semipermeable membrane according to <6>, in which the polymer solution A and the polymer solution B are different from each other in composition.

<8> The composite semipermeable membrane according to <7>, in which the polymer solution A has a solid concentration a (% by weight) and the polymer solution B has a solid concentration b (% by weight), the solid concentrations a and b satisfying a relationship expression of a/b≤1.0.

<9> The composite semipermeable membrane according to any one of <5> to <8>, in which, when an average thickness of the porous supporting layer is expressed by d, an average porosity of a portion of the porous supporting layer which ranges from 0 to 0.1 d in terms of a distance from an interface between the porous supporting layer and the separation functional layer is expressed by $\Phi_1$, and an average porosity of a portion of the porous supporting layer which ranges from 0.1 d to d in terms of the distance is expressed by $\Phi_2$, then $\Phi_1 < 0.35$ and $\Phi_2 > 0.70$.

<10> The composite semipermeable membrane according to any one of <1> to <9>, in which the substrate of the porous supporting membrane is a long-fiber nonwoven fabric including a polyester.

<11> The composite semipermeable membrane according to any one of <1> to <10>, in which the separation functional layer is a polyamide obtained by polycondensation of a polyfunctional amine with a polyfunctional acid halide, and the polyamide is constituted of units of the polyfunctional amine and units of the polyfunctional acid halide in a presence ratio represented by the following relationship:

(Number of moles of the units of the polyfunctional amine)/(number of moles of the units of the polyfunctional acid halide)≥1.6.

<12> The composite semipermeable membrane according to any one of <1> to <11>, in which, when an indenter is forced into the any ten sites of the separation functional layer in a hardness test according to a nanoindentation method to result in a displacement of 50 nm, the ten sites have an average load of 0.50 μN or greater.

<13> The composite semipermeable membrane according to <12>, in which the average load is 1.00 μN or greater.

<14> The composite semipermeable membrane according to any one of <1> to <13>, which, after having been subjected over 24 hours to a filtration treatment in which an aqueous solution having an NaCl concentration of 3.5% by weight, a temperature of 25° C., and a pH of 6.5 is supplied to the composite semipermeable membrane at an operation pressure of 5.5 MPa and thereafter subjected repeatedly to 5,000 cycles of a filtration treatment with the composite semipermeable membrane, each cycle including holding for 1 minute at an operation pressure of 5.5 MPa, subsequently lowering the pressure to 0 MPa over 30 seconds, thereafter maintaining the pressure for 1 minute, and then elevating the pressure to 5.5 MPa over 30 seconds, has a water production rate of 1.00 m³/m²/day or higher and a salt rejection of 99.80% or higher when the aqueous solution is passed through the composite semipermeable membrane at an operation pressure of 4.0 MPa.

Thus, a composite semipermeable membrane which combines high salt-removing ability and water permeability under such conditions that operation and stopping are frequently repeated to cause pressure fluctuates is rendered possible.

DESCRIPTION OF REFERENCE NUMERALS AND SIGNS

1 Separation functional layer
H1 to H5 Height of projection in pleated structure of separation functional layer
D1 to D5 Depth of depression in pleated structure of separation functional layer

DETAILED DESCRIPTION

Examples of our membranes are explained below in detail, but the disclosure should not be construed as being limited to the following explanation. The membranes can be modified at will unless the modifications depart from the scope of the appended claims.

1. Composite Semipermeable Membrane

The composite semipermeable membrane includes: a porous supporting membrane including a substrate and a porous supporting layer disposed on the substrate; and a separation functional layer disposed on the porous supporting layer.

(1-1) Separation Functional Layer

The separation functional layer is a layer that, in the composite semipermeable membrane, has the function of separating solutes. The configuration of the separation functional layer, including the composition and thickness thereof, is set in accordance with the intended use of the composite semipermeable membrane.

In general, as the height of projections (hereinafter sometimes referred to as "pleats") on a separation functional layer is increased, the water permeability improves but salt permeability also increases. In addition, since such excessively enlarged pleats are prone to deform during pressurization and hence result in a decrease in membrane area and partial destruction during pressurization, the presence of such pleats is causative of decreases in water permeability and salt-removing ability. Especially in composite semipermeable membranes for seawater desalination in which the system is operated at a relatively high pressure, that tendency is prone to be reflected in the performance.

We hence directed our attention to surface projection structures. As a result, we found that both high salt-removing ability and water permeability can be attained by precisely controlling the number density and height of projections. We further found that in systems where the pressure fluctuates, as in use in filtration devices where operation and stopping are frequently repeated, membranes having projections in a high number density and having a small projection height are less apt to change in water permeability than membranes having projections in a low number density and having a large projection height.

The projections of the separation functional layer have an average height of preferably less than 100 nm, more preferably less than 90 nm. When the height of the projections is less than 100 nm, the pleats neither deform nor collapse even under such conditions that the pressure fluctuates, as when a filtration device including the composite semipermeable membrane is repeatedly operated and stopped frequently, and stable membrane performance can be obtained.

The average number density of projections of the separation functional layer is preferably 10.0 projections/μm or higher, more preferably 13.0 projections/µm or higher. When the average number density thereof is 10.0 projections/µm or higher, this composite semipermeable membrane has an increased surface area and sufficient water permeability is obtained. In addition, the projections can be inhibited from deforming during pressurization. Stable membrane performance is hence obtained.

Meanwhile, the average number density of projections of the separation functional layer is preferably 30.0 projections/µm or less. When the averages number density thereof is 30.0 projections/µm or less, the projections can be inhibited from coming into contact with each other to reduce the effective surface area.

The height and number density of projections are values determined through an examination of projections each having a height of one-fifth or more of the 10-point average surface roughness.

The 10-point average surface roughness is a value obtained by the following calculation method.

First, a cross-section perpendicular to the membrane surface is examined with an electron microscope at the magnification shown below. In the image of the cross-section obtained, the surface of the separation functional layer (indicated by reference numeral "1" in FIG. 1) is observed as a pleated curve which shows a protrusion and a recess that are consecutively repeated along the direction of the surface of the composite semipermeable membrane (a direction parallel with the surface of the membrane). With respect to this curve, a roughness curve is determined in accordance with the definition given in ISO 4287:1997.

Figure 1:
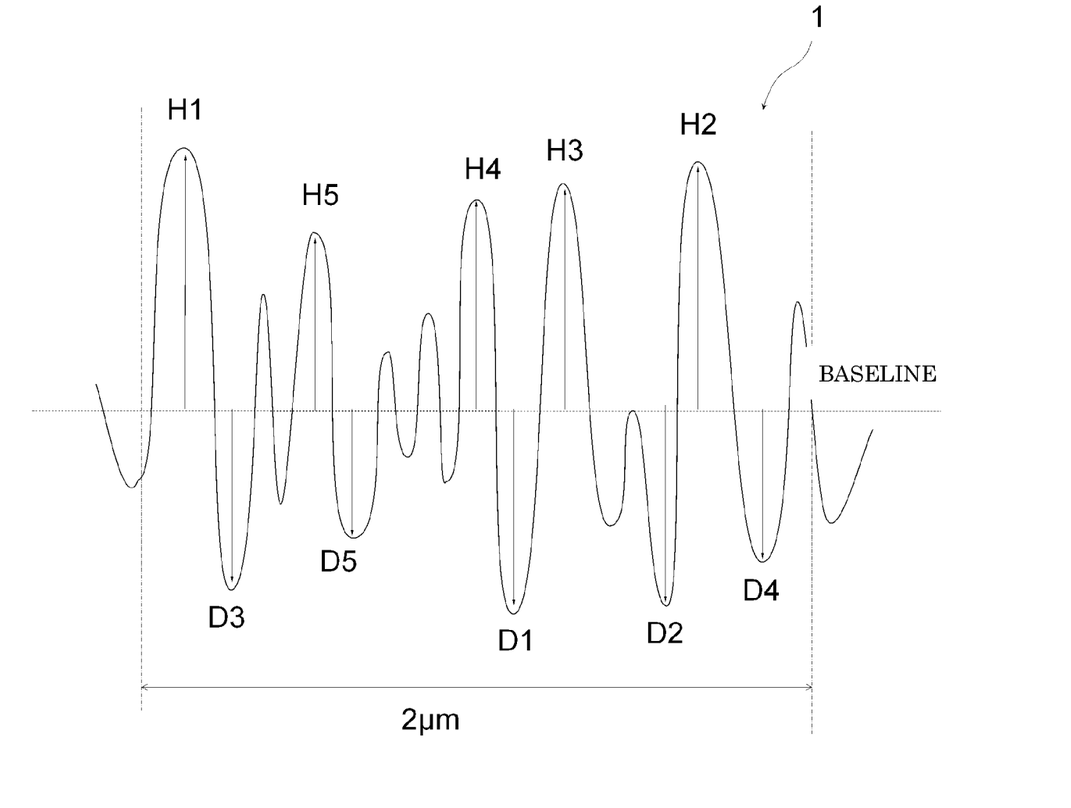
FIG. 1 schematically shows a method of measuring the heights of projections of a separation functional layer.

Cross-section images each having a width of 2.0 µm in the direction of an average line of the roughness curve are extracted (FIG. 1). The average line is a straight line defined on the basis of ISO 4287:1997, and is a straight line drawn throughout the measuring length so that the total area of regions surrounded by the average line and the roughness curve on the upper side of the average line is equal to that on the lower side of the average line.

In each extracted image having a width of 2.0 µm, the average line is taken as a baseline, and the heights of the peaks of the projections in the separation functional layer and the depths of the bottoms of the depressions therein are measured. The absolute values of the heights H1 to H5 of the five peaks ranging from the highest peak to the fifth peak are averaged, and the absolute values of the depths D1 to D5 of the five bottoms ranging from the deepest bottom to the fifth bottom are averaged. Furthermore, the two average values obtained are summed up. The sum thus obtained is the 10-point average surface roughness. The baseline in FIG. 1 has been drawn parallel with the horizontal direction for convenience of illustration.

Cross-sections of the separation functional layer can be examined with a scanning electron microscope or a transmission electron microscope. For example, in an examination with a scanning electron microscope, a composite semipermeable membrane sample is thinly coated with platinum, platinum-palladium, or ruthenium tetroxide, preferably with ruthenium tetroxide, and examined at an accelerating voltage of 3-6 kV using a high-resolution field emission scanning electron microscope (UHR-FE-SEM). As the high-resolution field emission scanning electron microscope, use can be made of electron microscope Type S-900, manufactured by Hitachi Ltd., or the like. The magnification is preferably 5,000-100,000 times, and is preferably 10,000-50,000 times from the standpoint of determining the heights of projections. In an electron photomicrograph obtained, the heights of projections can be directly measured with a scale or the like while taking account of the magnification.

The average number density of projections is determined in the following manner. When any ten sites of cross-sections of the composite semipermeable membrane are examined, the number of projections each having a height of one-fifth or more of the 10-point average surface roughness described above is counted in each cross-section. The number density (namely, the number of projections per 1 µm) in each cross-section is calculated, and an arithmetic average is calculated from the population densities in the ten sites of the cross-sections, thereby obtaining the average number density. Each cross-section has a width of 2.0 µm in the direction of the average line of the roughness curve.

Furthermore, the average height of projections is determined in the following manner. When any ten sites of cross-sections of the composite semipermeable membrane are examined, the heights of projections each having a height of one-fifth or more of the 10-point average surface roughness described above are measured with respect to each cross-section, and an average height of these projections is calculated. Moreover, an arithmetic average is calculated from the results of calculation for the ten sites of the cross-sections, thereby obtaining the average height. Each cross-section has a width of 2.0 µm in the direction of the average line of the roughness curve.

The standard deviation of height of projections is calculated on the basis of the heights of projections each having a height of one-fifth or more of the 10-point average surface roughness, the heights of projections being measured in ten sites of the cross-sections in the same manner as for the average height.

It is preferable that the projections of the separation functional layer should have a standard deviation of height of 70 nm or less. So long as the standard deviation thereof is within this range, the projections have an even height and, hence, stable membrane performance can be obtained even when the composite semipermeable membrane is used in an operation in which a high pressure is applied thereto.

The separation functional layer may include a polyamide as a main component. The polyamide constituting the separation functional layer can be formed by interfacial polycondensation of a polyfunctional amine with a polyfunctional acid halide. It is preferable that at least one of the polyfunctional amine and the polyfunctional acid halide should include a compound having a functionality of 3 or higher.

The expression "X includes Y as a main component" in this description means that Y accounts for 60% by weight or more of X. The proportion of Y is preferably 80% by weight or higher, more preferably 90% by weight or higher. Especially preferred is a constitution in which X substantially includes Y only.

The thickness of the separation functional layer including a polyamide as a main component (polyamide separation functional layer) is usually preferably 0.01-1 µm, more preferably 0.1-0.5 µm, from the standpoint of obtaining sufficient separation performance and a sufficient permeate amount.

The term "polyfunctional amine" used herein means an amine which has at least two primary amino groups and/or secondary amino groups in one molecule thereof and in which at least one of the amino groups is a primary amino group. Examples of the polyfunctional amine include: aromatic polyfunctional amines such as phenylenediamine in which the two amino groups have been bonded to the benzene ring at ortho, meta, or para positions to each other, xylylenediamine, 1,3,5-triaminobenzene, 1,2,4-triaminobenzene, 3,5-diaminobenzoic acid, 3-aminobenzylamine, and 4-aminobenzylamine; aliphatic amines such as ethylenediamine and propylenediamine; and alicyclic polyfunctional amines such as 1,2-diaminocyclohexane, 1,4-diaminocyclohexane, 4-aminopiperidine, and 4-aminoethylpiperazine. Of these, aromatic polyfunctional amines which each have two to four primary amino groups and/or secondary amino groups in one molecule thereof and in which at least one of these amino groups is a primary amino group are preferred when the selective separation properties, permeability, and heat resistance of the membrane are taken into account. Suitable for use as such polyfunctional aromatic amines are m-phenylenediamine, p-phenylenediamine, and 1,3,5-triaminobenzene. It is especially preferred to use m-phenylenediamine (hereinafter referred to as "m-PDA") among these, from the standpoints of availability and handleability.

These polyfunctional amines may be used alone, or two or more thereof may be used simultaneously. In simultaneously using two or more polyfunctional amines, two or more of those amines may be used in combination or any of those amines may be used in combination with an amine having at least two secondary amino groups in one molecule thereof. Examples of the amine having at least two secondary amino groups in one molecule thereof include piperazine and 1,3-bispiperidylpropane.

The term "polyfunctional acid halide" means an acid halide which has at least two halogenocarbonyl groups in one molecule thereof. Examples of trifunctional acid halides include trimesoyl chloride, 1,3,5-cyclohexanetricarbonyl trichloride, and 1,2,4-cyclobutanetricarbonyl trichloride. Examples of bifunctional acid halides include: aromatic bifunctional acid halides such as biphenyldicarbonyl dichloride, azobenzenedicarbonyl dichloride, terephthaloyl chloride, isophthaloyl chloride, and naphthalenedicarbonyl chloride; aliphatic bifunctional acid halides such as adipoyl chloride and sebacoyl chloride; and alicyclic bifunctional acid halides such as cyclopentanedicarbonyl dichloride, cyclohexanedicarbonyl dichloride, and tetrahydrofurandicarbonyl dichloride. When reactivity with the polyfunctional amine is taken into account, it is preferable that the polyfunctional acid halide should be a polyfunctional acid chloride. When the selective separation properties and heat resistance of the membrane are taken into account, it is more preferable that the polyfunctional acid halide should be a polyfunctional aromatic acid chloride which has 2-4 chlorocarbonyl groups in one molecule thereof. Of such acid chlorides, trimesoyl chloride is preferred from the standpoints of availability and handleability. These polyfunctional acid halides may be used alone, or two or more thereof may be simultaneously used.

It is preferable that the polyamide separation functional layer should be a polyamide obtained by the polycondensation of a polyfunctional amine with a polyfunctional acid halide. In this case, it is more preferable that the polyfunctional-amine units and the polyfunctional-acid-halide units, which constitute the polyamide separation functional layer, should be present in a ratio that satisfies the relationship of 1.6≤(number of moles of polyfunctionalamine units)/(number of moles of polyfunctional-acid-halide units)≤1.9. When the presence ratio thereof is within that range, crosslinks have been sufficiently formed between the polyfunctional amine and the polyfunctional acid halide, and sufficient physical durability which enables the separation functional layer to retain the shape even when the pressure fluctuates can be rendered possible. Furthermore, since the number of carboxyl groups remaining in the polyamide is sufficiently small, any structural change due to charge repulsion between carboxyl groups can be inhibited. The presence ratio thereof is more preferably 1.7 to 1.9.

The amino groups present as functional groups of the polyamide separation functional layer may be replaced with other functional groups by a post-treatment. For example, a treatment may be conducted in which the charge repulsion between amino groups is inhibited by reducing the content of ionic amino groups by bringing the layer into contact with sodium nitrite under acidic conditions. Also, in the polyamide separation functional layer which has undergone the post-treatment, it is preferable that the presence ratio expressed by "(number of moles of polyfunctional-amine units)/(number of moles of polyfunctional-acid-halide units)" using the presence ratio between the units derived from the polyfunctional-amine units, which are original units, and the units derived from the polyfunctional-acid-halide units, which also are original units, should be 1.6 to 1.9.

The presence ratio of the polyfunctional-amine units and the polyfunctional-acid-halide units in the polyamide separation functional layer can be determined by subjecting the separation functional layer peeled from the porous supporting membrane to $^{13}$C-NMR spectroscopy or by subjecting the separation functional layer peeled from the porous supporting membrane to hydrolysis with an aqueous solution of a strong alkali and subjecting the resultant sample to $^{1}$H-NMR spectroscopy.

It is preferable from the standpoint of physical durability that when an indenter is forced into the separation functional layer in a hardness test according to a nanoindentation method to result in a displacement of 50 nm, the average load should be 0.50 µN or greater. Although the specific method used for the hardness test is as described in Examples, the loads determined through a measurement on any ten sites of the separation functional layer are averaged and this average is taken as "average load."

The separation functional layer is not particularly limited in the hardness thereof so long as the layer shows an average load of at least 0.50 µN as a result of a measurement made by the method described in Examples. It is, however, more preferable that the average load thereof should be 1.00 µN or greater, from the standpoint of physical durability especially under such operation conditions that high-pressure operation and stopping are frequently repeated.

(1-2) Porous Supporting Membrane

The porous supporting membrane (hereinafter often referred to simply as "supporting membrane") includes a substrate and a porous supporting layer. This supporting membrane has substantially no ability to separate ions or the like, and can impart strength to the separation functional layer, which substantially has separation performance.

The thickness of the supporting membrane affects both the strength of the composite semipermeable membrane and the loading density of the membrane element produced using the composite semipermeable membrane. The thickness thereof is preferably 30-300 µm, more preferably 50-250 µm, from the standpoint of obtaining sufficient mechanical strength and loading density.

The terms "thickness of each layer" and "thickness of a membrane" herein mean average values unless otherwise indicated. The term "average value" herein means arithmetic average value. Namely, the thickness of each layer and that of the membrane are determined by calculating an average of 20 thickness values measured at intervals of 20 µm in a direction perpendicular to the thickness direction (i.e., in a membrane surface direction) in an examination of a cross-section.

Porous Supporting Layer

It is preferable that the porous supporting layer should include any of the following materials as a main component. As the material of the porous supporting layer, homopolymers or copolymers such as polysulfones, polyethersulfones, polyamides, polyesters, cellulosic polymers, vinyl polymers, poly(phenylene sulfide), poly(phenylene sulfide sulfone)s, poly(phenylene sulfone), and poly(phenylene oxide) can be used either alone or as a blend thereof. As the cellulosic polymers, use may be made of cellulose acetate, cellulose nitrate, and the like. As the vinyl polymers, use may be made of polyethylene, polypropylene, poly(vinyl chloride), polyacrylonitrile, and the like. Preferred of these are homopolymers or copolymers such as polysulfones, polyamides, polyesters, cellulose acetate, cellulose nitrate, poly(vinyl chloride), polyacrylonitrile, poly(phenylene sulfide), poly(phenylene sulfide sulfone)s, and poly(phenylene sulfone). More preferred examples include cellulose acetate, polysulfones, poly(phenylene sulfide sulfone)s, or poly(phenylene sulfone). Of these materials, polysulfones are especially preferred because they are highly stable chemically, mechanically, and thermally and are easy to mold.

Specifically, a polysulfone made up of repeating units represented by the following chemical formula is preferred as the material of the porous supporting layer because this polysulfone renders pore-diameter control easy and has high dimensional stability:

The porous supporting layer is obtained, for example, by casting an N,N-dimethylformamide (hereinafter referred to simply as "DMF") solution of the polysulfone on a substrate in a certain thickness, followed by subjecting to wet coagulation in water. By this method, a porous supporting layer in which most of the surface thereof has fine pores with a diameter of 1-30 nm can be obtained.

The thickness of the porous supporting layer is preferably 10-200 µm, more preferably 20-100 µm. Incidentally, the thickness of the substrate is preferably 10-250 µm, more preferably 20-200 µm.

The porous supporting layer is disposed on a substrate, and the surface of the porous supporting layer (i.e., the surface which faces the separation functional layer) has a grained structure. The higher the number density of the grains, the higher the number density of projections in the separation functional layer. The reason for this is thought to be as follows.

When a separation functional layer is formed, an aqueous solution of the polyfunctional amine comes into contact with the supporting membrane, and the aqueous solution of the polyfunctional amine is transported from inner parts to the surface of the porous supporting layer during polycondensation. The surface of the porous supporting layer functions as a field of reaction for the polycondensation, and projections of the separation functional layer are grown by supplying the aqueous solution of the polyfunctional amine from inside the porous supporting layer to the field of reaction. When the number density of grains in the surface of the porous supporting layer, which serves as a field of reaction, is high, the number of projection growth sites is large, resulting in an increased number density of projections. In general, porous supporting layers in which the number density of grains in the surface is high are dense and have a low porosity and a small pore diameter.

Meanwhile, when the porous supporting layer has a high porosity and has pores which have a large diameter and highly communicate with one another, an increased monomer feed rate is attained. Consequently, projections are apt to grow high.

Thus, the height and thickness of projections are determined by the amount of the aqueous polyfunctional amine solution which can be held by the porous supporting layer, the rate of release of the solution from the layer, and the feed amount of the solution, and the number density of projections can be controlled by the surface structure. Specifically, from the standpoint of making the porous supporting layer attain both the height and number density of projections described above, it is preferable that the portion thereof on the substrate side should have a high porosity and have pores having a large diameter and highly communicating one another and that the portion thereof on the separation functional layer side should have grains in a high number density.

It is preferable that the porous supporting layer should have, as a preferred example of such a structure, a multilayer structure including a first layer which efficiently transports an aqueous solution of the polyfunctional amine and a second layer which is located further toward the separation functional layer side than the first layer and serves to control the number density of projections. It is especially preferable that the first layer should be in contact with the substrate and that the second layer should be located as an outermost layer of the porous supporting layer to be in contact with the separation functional layer.

The first layer and the second layer each are formed by applying a polymer solution to a substrate. Methods of producing the layers will be described later.

The first layer serves to transport an aqueous solution of the polyfunctional amine, which is a monomer necessary to form the separation functional layer, to a field of polymerization. It is preferable that the first layer should have pores which communicate one another from the standpoint of efficiently transporting the monomer. It is especially preferable that the pore diameter thereof should be 0.1-1 µm.

The second layer functions as a field of polymerization and retains and releases the monomer, as described above, thereby supplying the monomer to the separation functional layer being formed and further providing sites where projection growth starts.

We note that although a porous supporting layer in which the surface has grains in a high number density is capable of forming projections in a high number density, there is a problem in that since this porous supporting layer is dense, the rate of monomer transport to the field of polymerization is low and the height of the projections thus formed is small and uneven. This problem is eliminated by configuring a porous supporting layer by disposing the first layer, which is a layer having pores communicating with one another, on the substrate side and thinly forming that dense layer as a second layer on the first layer. As a result, the monomer transport rate can be enhanced. Hence, projections having a large and even height can be formed. As described above, from the standpoint of simultaneously controlling the height, evenness, and number density of projections, it is preferable that the porous supporting layer should include the first layer and the second layer formed thereon.

Furthermore, it is preferable that the interface between layers included in the porous supporting layer should have a continuous structure. The interface between layers included in the porous supporting layer is, for example, the interface between the first layer and the second layer.

The term "continuous structure" means a structure in which no skin layer has been formed between the layers. The term "skin layer" herein means a portion having a high density. Specifically, the skin layer has surface pores having a size of 1-50 nm. When a skin layer has been formed between the layers, high resistance occurs in the porous supporting layer. Hence, the permeation flow rate decreases dramatically.

It is preferable that when the average thickness of the porous supporting layer is expressed by d, then the average porosity $\Phi_1$ of a portion of the porous supporting layer which is 0 to 0.1 d in terms of a distance from the interface between the porous supporting layer and the separation functional layer should be less than 0.35. When the average porosity thereof is within this range, the porous supporting layer obtained has grains on the surface thereof in a high number density and, as a result, a separation functional layer having projections in an increased number density is obtained. Consequently, a projection structure which withstands pressure fluctuations is rendered possible.

It is preferable that the average porosity $\Phi_2$ of a portion of the porous supporting layer which is 0.1 d to d in terms of the distance from the interface between the porous supporting layer and the separation functional layer should be higher than 0.70. When the average porosity thereof is within that range, the rate of monomer feeding to the field of reaction is sufficiently high and is even.

When the average porosities $\Phi_1$ and $\Phi_2$ are within those ranges, projections having a large surface area and an even height are obtained. Hence, a projection structure that satisfies both water production rate and physical strength for withstanding pressure fluctuations is obtained. Furthermore, since the rate of feeding the polyfunctional amine as a monomer becomes sufficiently high, the polyfunctional amine is sufficiently incorporated into the polyamide separation functional layer, making it possible to regulate the presence ratio described hereinabove, i.e., the ratio of the polyfunctional-amine units to the polyfunctional-acid-halide units which constitute the polyamide separation functional layer, to 1.6 or higher.

The average porosities $\Phi_1$ and $\Phi_2$ are determined in the following manner. First, the porosity $\Phi_0$ of the whole porous supporting layer is measured by the following procedure.

The porous supporting layer having a size of 10-cm square is peeled from the substrate. The average thickness d of any ten portions of the peeled porous supporting layer is determined using a film thickness meter to thereby determine the volume of the peeled porous supporting layer. The peeled porous supporting layer is vacuum-dried for 6 hours, and the weight of the dried layer is determined using a precision balance. From the volume and weight values obtained, the porosity $\Phi_0$ of the porous supporting layer is calculated using the following equation:

$$\Phi_0=1-\{(\text{weight of the porous supporting layer})/(\text{volume of the porous supporting layer})\}/(\text{specific gravity of the resin forming the porous supporting layer}).$$

Next, the average porosity $\Phi_2$ is determined.

$\Phi_2$ is determined from an electron-microscopic image of a cross-section of the peeled porous supporting layer. First, with respect to the porous supporting layer peeled from the substrate, an ultrathin section is produced using a cryomicrotome and subjected to element mapping using a scanning transmission electron microscope (STEM) and an energy dispersive X-ray spectrometer (EDX). As the scanning transmission electron microscope, use can be made of JEM-ARM200F, manufactured by JEOL Ltd., or the like. As the EDX detector, use can be made of JED-2300, manufactured by JEOL Ltd., or the like. With respect to the image of a portion of 0.1 d to d in terms of depth from the surface of the porous supporting layer, the distribution of an element that is characteristic for the resin (for example, sulfur atoms in the case of polysulfones) is extracted from the image obtained by the mapping with the EDX, and the area of portions occupied by the resin is determined. The ratio of the area of portions occupied by the resin to the area of the image of the cross-section including voids obtained with the STEM is determined. Thus, $\Phi_2$ can be calculated.

Since the structure of the portion of the porous supporting layer which ranges in depth from 0 to 0.1d is dense in many cases and it is difficult to discriminate between the resin and voids in the examination with an STEM and an EDX, the average porosity $\Phi_1$ of the portion can be determined from the overall porosity $\Phi_0$ and the average porosity $\Phi_2$ for the depths of 0.1 d to d using the following equation:

$$\Phi_1=1-\{(1-\Phi_0)-0.9\times(1-\Phi_2)\}/0.1.$$

Substrate

Examples of the substrate as a constituent component of the supporting membrane include polyester-based polymers, polyamide-based polymers, polyolefin-based polymers, or mixtures or copolymers thereof. It is, however, preferable that the substrate should be a polyester-based polymer because a supporting membrane superior in mechanical strength, heat resistance, water resistance and the like is obtained therewith. These polymers may be used alone, or two or more thereof may be used simultaneously.

The polyester-based polymers are polyesters each formed from an acid ingredient and an alcohol ingredient. As the acid ingredient, use can be made of aromatic carboxylic acids such as terephthalic acid, isophthalic acid, and phthalic acid; aliphatic dicarboxylic acids such as adipic acid and sebacic acid; alicyclic dicarboxylic acids such as cyclohexanedicarboxylic acid, and the like. As the alcohol ingredient, use can be made of ethylene glycol, diethylene glycol, polyethylene glycol, and the like.

Examples of the polyester-based polymers include poly(ethylene terephthalate) resins, poly(butylene terephthalate) resins, poly(trimethylene terephthalate) resins, poly(ethylene naphthalate) resins, poly(lactic acid) resins, and poly(butylene succinate) resins, and further include copolymers of these resins.

As fabric for use as the substrate, it is preferred to employ a fibrous substrate, from the standpoints of strength, ruggedness-forming ability, and fluid permeability. As the substrate, use of either long-fiber nonwoven fabric or short-fiber nonwoven fabric is preferred. In particular, long-fiber nonwoven fabric is excellent in terms of penetrability when a solution of a high-molecular-weight polymer is poured onto the nonwoven fabric as a substrate, and is capable of inhibiting the porous supporting layer from peeling off and inhibiting the occurrence of troubles, for example, that substrate fluffing or the like results in formation of an uneven film or in occurrence of defects such as pin-holes. It is especially preferable that the substrate should be constituted of long-fiber nonwoven fabric configured of thermoplastic continuous filaments. Also in view of the fact that tension is applied in the membrane production direction when a semipermeable membrane is continuously produced, it is preferable that long-fiber nonwoven fabric having excellent dimensional stability should be used as the substrate.

From the standpoints of formability and strength, it is preferable that the long-fiber nonwoven fabric should be one in which the fibers in the surface layer on the side opposite to the porous supporting layer have been oriented more in the machine direction than the fibers present in the surface layer on the side facing the porous supporting layer. This structure not only produces the effect of highly preventing membrane breakage or the like by maintaining strength, but also enables a layered product including the porous supporting layer and this substrate to show improved formability when ruggedness is imparted to this semipermeable membrane, resulting in a semipermeable-membrane surface having a stable rugged shape. That structure is hence preferred. More specifically, it is preferable that, in the surface layer of the long-fiber nonwoven fabric on the side opposite the porous supporting layer, the degree of fiber orientation should be 0°-25°, and that the difference in the degree of fiber orientation between that surface layer and the surface layer on the side facing the porous supporting layer should be 10°-90°.

As described above, it is preferable that the substrate as a constituent component of the supporting membrane should be long-fiber nonwoven fabric including a polyester.

Steps of producing the composite semipermeable membrane and steps of producing an element include steps of heating, and a phenomenon occurs in which the porous supporting layer or the separation functional layer contracts upon heating. Especially in continuous membrane production, the contraction is remarkable in the transverse direction in which no tension is applied. Since the contraction causes problems concerning dimensional stability and the like, use of a substrate having a low degree of thermal dimensional change is desirable. When the nonwoven fabric is one in which the difference between the degree of fiber orientation in the surface layer on the side opposite to the porous supporting layer and the degree of fiber orientation in the surface layer on the side facing the porous supporting layer is 10°-90°, transverse-direction changes due to heat can be inhibited. This nonwoven fabric is hence preferred.

The degree of fiber orientation here is an index showing the direction of the fibers of the nonwoven-fabric substrate which constitutes the porous supporting layer. Specifically, the degree of fiber orientation is the average angle between the direction of membrane production in continuous membrane production, i.e., the longitudinal direction of the nonwoven-fabric substrate, and the fibers constituting the nonwoven-fabric substrate. Namely, when the longitudinal direction of the fibers is parallel with the direction of membrane production, the degree of fiber orientation is 0°. Meanwhile, when the longitudinal direction of the fibers is perpendicular to the direction of membrane production, i.e., parallel with the transverse direction of the nonwoven-fabric substrate, then the degree of orientation of the fibers is 90°. Consequently, the closer the degree of fiber orientation to 0°, the more the fibers have been oriented in the machine direction, while the closer the degree of fiber orientation to 90°, the more the fibers have been oriented in the transverse direction.

The degree of fiber orientation is measured in the following manner. First, ten small-piece samples are randomly cut out from the nonwoven fabric. Next, surfaces of the samples are photographed with a scanning electron microscope at a magnification of 100-1,000 times. In the photographs, ten fibers are selected from each sample, and the angle between each fiber and the longitudinal direction of the nonwoven fabric (machine direction, or direction of membrane production) which is taken as 0° is measured. Namely, such angle measurement is made on 100 fibers in total per sheet of nonwoven fabric. From the angles thus measured on 100 fibers, an average value is calculated. The average value obtained is rounded off to the nearest whole number, and the value thus obtained is the degree of fiber orientation.

(1-3) Water Production Rate and Salt Rejection

It is preferable that the composite semipermeable membrane should have a water production rate of 1.0 $m^3/m^2$/day or higher and a salt rejection of 99.5% or higher after an aqueous solution having an NaCl concentration of 3.5% by weight, a temperature of 25° C., an a pH of 6.5 is passed through the composite semipermeable membrane at an operation pressure of 5.5 MPa for 24 hours. This is because when this composite semipermeable membrane is used as a reverse osmosis membrane element in a water treatment plant, a sufficient water production rate and high water quality are rendered possible. It is more preferable that the composite semipermeable membrane should have a water production rate of 1.00 $m^3/m^2$/day or higher and a salt rejection of 99.8% or higher after an aqueous solution having an NaCl concentration of 3.5% by weight, a temperature of 25° C., an a pH of 6.5 is passed through the composite semipermeable membrane at an operation pressure of 4.0 MPa for 24 hours. This is because this composite semipermeable membrane enables the plant to be operated in a more energy-saving manner.

Furthermore, it is preferable that the composite semipermeable membrane, after
  (i) having been subjected over 24 hours to a filtration treatment in which an aqueous solution having an NaCl concentration of 3.5% by weight, a temperature of 25° C., and a pH of 6.5 is supplied to the composite semipermeable membrane at an operation pressure of 5.5 MPa and
  (ii) thereafter subjected repeatedly to 5,000 cycles of a filtration treatment with the composite semipermeable membrane, each cycle including holding for 1 minute at an operation pressure of 5.5 MPa, subsequently lowering the pressure to 0 MPa over 30 seconds, thereafter maintaining the pressure for 1 minute, and then elevating the pressure to 5.5 MPa over 30 seconds, has a water production rate of 0.85 $m^3/m^2$/day or higher and a salt rejection of 99.5% or higher when
  (iii) the aqueous solution is passed through the composite semipermeable membrane at an operation pressure of 5.5 MPa.

It is more preferable that the composite semipermeable membrane should have a water production rate of 1.00 $m^3/m^2$/day or higher and a salt rejection of 99.80% or higher when the operation pressure in (iii) above is 4.0 MPa, because the plant can be operated in an even more energy-saving manner.

2. Process of Producing the Composite Semipermeable Membrane

Next, a process of producing the composite semipermeable membrane is explained. The production process includes a step of forming a supporting membrane and a step of forming a separation functional layer.

(2-1) Step for Forming Supporting Membrane

The step of forming a supporting membrane may include a step in which a polymer solution is applied to a porous substrate, a step in which the polymer solution is impregnated into the porous substrate, and a step in which the porous substrate impregnated with the solution is immersed in a coagulation bath in which the polymer has a lower solubility than in good solvents therefor, thereby coagulating the polymer to form a three-dimensional network structure. The step of forming a supporting membrane may further include a step in which a polymer as a component of the porous supporting layer is dissolved in a good solvent for the polymer to prepare a polymer solution.

By controlling impregnation of the polymer solution into the substrate, a supporting membrane having a predetermined structure can be obtained. Examples of methods of controlling impregnation of the polymer solution into the substrate include a method in which the time period from the application of the polymer solution to the substrate to immersion in a non-solvent is controlled and a method in which the temperature or concentration of the polymer solution is controlled to thereby regulate the viscosity thereof. It is also possible to use these methods in combination.

The time period from the application of a polymer solution to a substrate to immersion in a coagulation bath is usually preferably 0.1-5 seconds. So long as the time period to the immersion in a coagulation bath is within this range, the organic-solvent solution containing a polymer is solidified after having been sufficiently impregnated into interstices among the fibers of the substrate. Incidentally, such a preferred range of the time period to the immersion in a coagulation bath may be suitably regulated in accordance with the viscosity of the polymer solution to be used.

We found that the higher the polymer concentration (i.e., solid concentration) in the polymer solution, the higher the number density of grains in the surface of the porous supporting layer obtained and, as a result, the higher the number density of projections in the separation functional layer. From the standpoint that a projection structure capable of withstanding pressure fluctuations is rendered possible, it is preferable that at least the surface layer of the porous supporting layer which is on the side facing the separation functional layer should be formed using a polymer solution having a solid concentration for second-layer formation.

As described above, when the porous supporting layer has a multilayer structure including a first layer and a second layer, the polymer solution A for forming the first layer and the polymer solution B for forming the second layer may differ from each other in composition. The expression "differ in composition" herein means that the polymer solutions differ from each other in at least one element selected from the kind of the polymer contained, the solid concentration thereof, the kind of any additive, the concentration thereof, and the kind of solvent.

The solid concentration a of the polymer solution A is preferably 12% by weight or more, more preferably 13% by weight or more. When the solid concentration a is 12% by weight or more, communicating pores are formed to be relatively small. Hence, a desired pore diameter is easy to obtain.

The solid concentration a is preferably 18% by weight or less, more preferably 15% by weight or less. When the solid concentration a is 18% by weight or less, phase separation proceeds sufficiently before polymer coagulation and, hence, a porous structure is easy to obtain.

The solid concentration b of the polymer solution B is preferably 14% by weight or more, more preferably 15% by weight or more, even more preferably 20% by weight or more, especially preferably 26% by weight or more. When the solid concentration b of the polymer solution B is 14% by weight or more, the porous structure is inhibited from deforming even when the operation pressure fluctuates considerably. Since the second layer directly supports the separation functional layer, a deformation of the second layer can be a cause of breakage of the separation functional layer.

The solid concentration b is preferably 35% by weight or less, more preferably 30% by weight or less. When the solid concentration b of the polymer solution B is 35% by weight or less, the diameter of the surface pores of the porous supporting layer is regulated to such a degree that the monomer feed rate during the formation of a separation functional layer does not become too low. Consequently, projections having an appropriate height are formed during the formation of a separation functional layer.

It is preferable that the solid concentration a and the solid concentration b should satisfy the relational expression $a/b \leq 1.0$, because such concentrations render precise control of projection height possible to give projections of an even size, thereby attaining both higher salt-removing ability and water permeability. It is more preferable that the solid concentration a and the solid concentration b should satisfy the respective preferred numerical ranges shown above and simultaneously satisfy the relational expression.

The term "solid concentration" used above can be replaced by "polymer concentration." When the polymer for forming the porous supporting layer is a polysulfone, the term "solid concentration" used above can be replaced by "polysulfone concentration."

The temperature of each polymer solution at the time when the polymer solution is applied is usually preferably 10-60° C., when the polymer is, for example, a polysulfone. So long as the temperature thereof is within this range, the organic solvent solution containing a polymer is solidified after having been sufficiently impregnated into interstices among the fibers of the substrate, without precipitation of the polymer. As a result, a supporting membrane tenaciously bonded to the substrate by an anchoring effect can be obtained as the supporting membrane. Incidentally, the temperature range for each polymer solution may be suitably regulated in accordance with, for example, the viscosity of the polymer solution to be used.

It is preferable that when a supporting membrane is formed, the polymer solution B of forming a second layer should be applied simultaneously with application of the polymer solution A for forming a first layer to the substrate. When there is a curing time after application of the polymer solution A, a skin layer having a high density is formed in the surface of the first layer by phase separation of the polymer solution A to considerably reduce the permeation flow rate. It is therefore preferable that the polymer solution B should be applied simultaneously with application of the polymer solution A so that the polymer solution A does not form a high-density skin layer through phase separation. It is preferable that the polymer solutions applied should then be brought into contact with a coagulation bath to cause phase separation, thereby forming a porous supporting layer. The expression "applied simultaneously," for example, means that the polymer solution A is in contact with the polymer solution B before arriving at the substrate. Namely, that expression means that the polymer solution B is in the stage of having been applied to the surface of the polymer solution A at the time when the polymer solution A is applied to the substrate.

The polymer solutions can be applied to the substrate by various coating techniques. However, it is preferred to employ a pre-metering coating technique capable of feeding the coating solutions at an accurate amount such as die coating, slide coating, curtain coating, or the like. Furthermore, to form the porous supporting layer having the multilayer structure, it is more preferred to use a double-slit die method in which the polymer solution to form the first layer and the polymer solution to form the second layer are simultaneously applied.

The polymer contained in the polymer solution A and the polymer contained in the polymer solution B may be the same or different. Various properties of the supporting membrane to be produced such as strength characteristics, permeation characteristics, and surface characteristics, can be suitably regulated in wider ranges.

The solvent contained in the polymer solution A and the solvent contained in the polymer solution B may be the same or different, so long as the solvents are good solvents for the polymers. The solvents can be suitably regulated in wider ranges while taking account of the strength characteristics of the supporting membrane to be produced and the impregnation of the polymer solution into the substrate.

The term "good solvents" means solvents that dissolve the polymers to form the porous supporting layer. Examples of the good solvents include N-methyl-2-pyrrolidone (NMP); tetrahydrofuran; dimethyl sulfoxide; amides such as tetramethylurea, dimethylacetamide, and dimethylformamide; lower-alkyl ketones such as acetone and methyl ethyl ketone; esters and lactones such as trimethyl phosphate and γ-butyrolactone; and mixed solvents thereof Examples of non-solvents for the polymers include: water; aliphatic hydrocarbons, aromatic hydrocarbons, and aliphatic alcohols such as hexane, pentane, benzene, toluene, methanol, ethanol, trichloroethylene, ethylene glycol, diethylene glycol, triethylene glycol, propylene glycol, butylene glycol, pentanediol, hexanediol, and low-molecular-weight polyethylene glycol; or mixed solvents thereof.

The polymer solutions may contain additives to regulate the pore diameter, porosity, hydrophilicity, elastic modulus and the like of the supporting membrane. Examples of additives to regulate pore diameter and porosity include: water; alcohols; water-soluble polymers such as polyethylene glycol, polyvinylpyrrolidone, poly(vinyl alcohol), and poly(acrylic acid), or salts thereof inorganic salts such as lithium chloride, sodium chloride, calcium chloride, and lithium nitrate; and formaldehyde and formamide. However, the additives are not limited to these examples. Examples of additives for regulating hydrophilicity and elastic modulus include various surfactants.

As the coagulation bath, water is usually used. However, use may be made of any bath in which the polymers do not dissolve. The temperature of the coagulation bath is preferably −20° C. to 100° C., more preferably 10-30° C. When the temperature thereof is 100° C. or lower, the surface of the coagulation bath is inhibited from vibrating due to thermal motion and a smooth membrane surface can be formed. Furthermore, when the temperature thereof is −20° C. or higher, a relatively high coagulation rate can be maintained and satisfactory membrane-forming properties are rendered possible.

Next, the supporting membrane obtained under such preferred conditions is cleaned with hot water to remove the membrane formation solvents remaining in the membrane. The temperature of this hot water is preferably 50-100° C., more preferably 60-95° C. When the temperature thereof is higher than this range, the supporting membrane contracts to a higher degree, resulting in a decrease in water permeability. Conversely, when the temperature thereof is too low, the cleaning effect is insufficient.

(2-2) Formation of Separation Functional Layer

Next, formation of a layer including a polyamide as a main component (polyamide separation functional layer) is explained as an example of the step of forming a separation functional layer which is a constituent component of the composite semipermeable membrane.

The step of forming a polyamide separation functional layer includes an operation in which an aqueous solution containing the polyfunctional amine described above and an organic-solvent solution which contains the polyfunctional acid halide and is immiscible with water are subjected to interfacial polycondensation on the surface of the supporting membrane, thereby forming a polyamide framework.

The concentration of the polyfunctional amine in the aqueous polyfunctional amine solution is preferably 0.1-20% by weight, more preferably 0.5-15% by weight. When the concentration thereof is within that range, it is possible to obtain sufficient water permeability and the sufficient ability to remove salts and boron.

The aqueous polyfunctional amine solution may contain a surfactant, organic solvent, alkaline compound, antioxidant and the like, so long as these ingredients do not inhibit the reaction between the polyfunctional amine and the polyfunctional acid halide. Surfactants have an effect of improving the wettability of the surface of the supporting membrane and reducing interfacial tension between the aqueous amine solution and the nonpolar solvent. Since some organic solvents act as a catalyst for interfacial polycondensation reactions, addition of an organic solvent enables the interfacial polycondensation reaction to be performed efficiently.

To perform the interfacial polycondensation on the supporting membrane, the aqueous polyfunctional amine solution described above is first brought into contact with the supporting membrane. It is preferable that the aqueous solution should be evenly and continuously contacted with the surface of the supporting membrane. Specific examples of methods therefor include a method in which the supporting membrane is coated with the aqueous polyfunctional amine solution and a method in which the supporting membrane is immersed in the aqueous polyfunctional amine solution.

The period during which the supporting membrane is in contact with the aqueous polyfunctional amine solution is preferably 5 seconds to 10 minutes, more preferably 10 seconds to 3 minutes.

After the aqueous polyfunctional amine solution is brought into contact with the supporting membrane, the excess solution is sufficiently removed so that no droplets remain on the membrane. There are cases that portions where droplets remain become defects in the resultant composite semipermeable membrane, and these defects reduce the removal performance of the composite semipermeable membrane. By sufficiently removing the excess solution, the occurrence of defects can be inhibited.

Examples of methods of removing the excess solution include a method in which the supporting membrane which has been contacted with the aqueous polyfunctional amine solution is held vertically to make the excess aqueous solution flow down naturally and a method in which streams of a gas, e.g., nitrogen, are blown against the supporting membrane from air nozzles to forcedly remove the excess solution, as described in JP-A-2-78428. After removal of the excess solution, the membrane surface may be dried to remove some of the water contained in the aqueous solution.

Subsequently, an organic-solvent solution that contains a polyfunctional acid halide and is immiscible with water is contacted with the supporting membrane which has been contacted with the aqueous polyfunctional amine solution, thereby forming a crosslinked-polyamide separation functional layer through interfacial polycondensation.

The concentration of the polyfunctional acid halide in the water-immiscible organic-solvent solution is preferably 0.01-10% by weight, more preferably 0.02-2.0% by weight. When the concentration of the polyfunctional acid halide is 0.01% by weight or more, a sufficient reaction rate is obtained. When the concentration thereof is 10% by weight or less, side reactions can be inhibited from occurring. Furthermore, incorporation of an acylation catalyst such as DMF into this organic-solvent solution is more preferred because the interfacial polycondensation is accelerated thereby.

It is desirable that the water-immiscible organic solvent should be one in which the polyfunctional acid halide dissolves and which does not damage the supporting membrane. The organic solvent may be any organic solvent which is inert to the polyfunctional amine compound and the polyfunctional acid halide. Preferred examples thereof include hydrocarbon compounds such as hexane, heptane, octane, nonane, and decane.

To bring the organic-solvent solution containing a polyfunctional acid halide into contact with the supporting membrane, use can be made of the same method as that for coating the supporting membrane with the aqueous polyfunctional amine solution.

In the step of interfacial polycondensation, it is important that the surface of the supporting membrane should be sufficiently covered with a crosslinked-polyamide thin film and that the water-immiscible organic-solvent solution containing a polyfunctional acid halide, which has been contacted therewith, should remain on the supporting membrane. For this reason, the period during which the interfacial polycondensation is performed is preferably 0.1 second to 3 minutes, more preferably 0.1 second to 1 minute. When the period during which the interfacial polycondensation is performed is 0.1 second to 3 minutes, the surface of the supporting membrane can be sufficiently covered with a crosslinked-polyamide thin film and the organic-solvent solution containing a polyfunctional acid halide can be held on the supporting membrane.

After a polyamide separation functional layer is formed on the supporting membrane by the interfacial polycondensation, the excess solvent is removed. To remove the excess solvent, use can be made, for example, of a method in which the membrane is held vertically to remove the excess organic solvent by allowing the solvent to flow down naturally. In this case, the period of vertically holding the membrane is preferably 1-5 minutes, more preferably 1-3 minutes. When the holding period is too short, a separation functional layer is not completely formed. When the holding period is too long, the organic solvent is excessively removed, resulting in a polyamide separation functional layer having vacant spots therein to reduce the membrane performance.

3. Use of the Composite Semipermeable Membrane

The composite semipermeable membrane thus produced can be used in the following manner. The composite semipermeable membrane is wound around a cylindrical collecting pipe having a large number of perforations, together with a raw-water channel member such as a plastic net, a permeate channel member such as tricot, and a film optionally used for enhancing pressure resistance, thereby fabricating a spiral type composite semipermeable membrane element. Furthermore, such elements can connect serially or in parallel and housed in a pressure vessel, thereby configuring a composite semipermeable membrane module.

Moreover, the composite semipermeable membrane, the element thereof, or the module can be combined with a pump to supply raw water thereto, a device to pretreat the raw water and the like, thereby configuring a fluid separator. By using this separator, raw water can be separated into permeate such as potable water, and a concentrate which has not passed through the membrane. Thus, water suited for a purpose can be obtained.

Higher operation pressures for the fluid separator are effective in improving the salt-removing ability. However, in view of the resultant increase in the amount of energy necessary for the operation and in view of the durability of the composite semipermeable membrane, the operation pressure at the time when water to be treated is passed through the composite semipermeable membrane is preferably 1.0-10 MPa. The term "operation pressure" means the so-called transmembrane pressure difference. With respect to the temperature of the feed water, the salt-removing ability decreases as the temperature thereof rises. However, as the temperature thereof declines, the membrane permeation flux decreases. Consequently, the temperature thereof is preferably 5-45° C. With respect to the pH of the feed water, too high pH values thereof result in a possibility that, in the case of feed water having a high salt concentration such as seawater, scale of magnesium or the like might occur. There also is a possibility that the membrane might deteriorate due to high-pH operation. Consequently, it is preferable that the separator should be operated in a neutral range.

Examples of the raw water to be treated with the composite semipermeable membrane include liquid mixtures having a TDS (total dissolved solids) of 500 mg/L to 100 g/L such as seawater, brackish water, and wastewater. In general, TDS means the total content of dissolved solids, and is expressed in terms of "weight/volume" or in terms of "weight ratio," assuming 1 L as 1 kg. According to a definition, the content can be calculated from the weight of a residue obtained by evaporating, at a temperature of 39.5-40.5° C., a solution filtered through a 0.45-μm filter. However, a simpler method is to convert from practical salinity.

EXAMPLES

Our membranes will be explained below in more detail by reference to Examples, but this disclosure should not be construed as being limited by the following Examples.

Production of Composite Semipermeable Membranes

Example 1

A polysulfone as a solute was mixed with DMF as a solvent, and the mixture was kept at 90° C. with stirring for 2 hours. Thus, a DMF solution having a polysulfone concentration of 15% by weight (polymer solution A) and a DMF solution having a polysulfone concentration of 25% by weight (polymer solution B) were respectively prepared.

The polymer solutions A and B prepared were each cooled to room temperature, supplied to separate extruders and subjected to high-accuracy filtration. Thereafter, the polymer solutions filtered were simultaneously cast through a double-slit die on a long-fiber nonwoven fabric (fiber diameter: 1 dtex, thickness: about 90 μm, air permeability: 1.3 mL/cm$^2$/sec) composed of poly(ethylene terephthalate) fibers. The polymer solution A was cast to a thickness of 110 μm and the polymer solution B was cast to a thickness of 50 μm. Immediately thereafter, the coated nonwoven fabric was immersed in 25° C. pure water and cleaned for 5 minutes. Thus, a porous supporting membrane was obtained.

The supporting membrane obtained was immersed in a 4.0% by weight aqueous solution of m-PDA for 2 minutes and then slowly pulled up while keeping the membrane surfaces vertical. Nitrogen was blown thereagainst from an air nozzle to remove the excess aqueous solution from the surfaces of the supporting membrane. Thereafter, a 25° C. n-decane solution containing 0.12% by weight of trimesoyl chloride was applied to a surface of the membrane so that the membrane surface was completely wetted. After this membrane was allowed to stand still for 1 minute, the membrane surface was held vertically for 1 minute to remove the excess solution from the membrane. Thereafter, the membrane was cleaned with 45° C. water for 2 minutes to thereby obtain a composite semipermeable membrane including a substrate, a porous supporting layer, and a polyamide separation functional layer.

Example 2

A composite semipermeable membrane according to Example 2 was obtained in the same manner as in Example 1, except that a DMF solution having a polysulfone concentration of 18% by weight was prepared as a polymer solution A.

Example 3

A composite semipermeable membrane according to Example 3 was obtained in the same manner as in Example 1, except that a DMF solution having a polysulfone concentration of 28% by weight was prepared as a polymer solution B and the temperature of the pure water for immersion was changed to 10° C.

Example 4

A composite semipermeable membrane according to Example 4 was obtained in the same manner as in Example 1, except that a DMF solution having a polysulfone concentration of 30% by weight was prepared as a polymer solution B, that the temperature of the pure water for immersion was changed to 10° C. and the polymer solution B was cast to a thickness of 25 μm.

Example 5

A composite semipermeable membrane according to Example 5 was obtained in the same manner as in Example 1, except that an NMP solution having a polysulfone concentration of 15% by weight was used as a polymer solution A and an NMP solution having a polysulfone concentration of 25% by weight was prepared as a polymer solution B.

Example 6

A composite semipermeable membrane according to Example 6 was obtained in the same manner as in Example 1, except that a DMF solution having a polysulfone concentration of 18% by weight was used as a polymer solution A and a DMF solution having a polysulfone concentration of 20% by weight was used as a polymer solution B.

Example 7

A composite semipermeable membrane according to Example 7 was obtained in the same manner as in Example 1, except that short-fiber nonwoven fabric having a fiber diameter of 1 dtex, a thickness of about 90 μm, and an air permeability of 0.7 mL/cm$^2$/sec was used as a substrate.

Comparative Example 1

A porous supporting membrane was obtained in the same manner as in Example 1, except that the polymer solution B was not used and that a DMF solution having a polysulfone concentration of 25% by weight was applied as a polymer solution A, as the only polymer solution, on the nonwoven fabric in a thickness of 160 μm using not a double-slit die but a single-slit die. A separation functional layer was formed on the resultant porous supporting membrane in the same manner as in Example 1, thereby obtaining a composite semipermeable membrane according to Comparative Example 1.

Comparative Example 2

A composite semipermeable membrane according to Comparative Example 2 was obtained in the same manner as in Comparative Example 1, except that a DMF solution having a polysulfone concentration of 15% by weight was prepared as a polymer solution A.

Comparative Example 3

A composite semipermeable membrane according to Comparative Example 3 was obtained in the same manner as in Comparative Example 1, except that an NMP solution having a polysulfone concentration of 15% by weight was used as a polymer solution A.

Comparative Example 4

A composite semipermeable membrane according to Comparative Example 4 was obtained in the same manner as in Example 1, except that a DMF solution having a polysulfone concentration of 13% by weight was used as a polymer solution A and a DMF solution having a polysulfone concentration of 20% by weight was used as a polymer solution B.

Comparative Example 5

A composite semipermeable membrane according to Comparative Example 5 was obtained in the same manner as in Example 1, except that a DMF solution having a polysulfone concentration of 25% by weight was used as a polymer solution A and a DMF solution having a polysulfone concentration of 15% by weight was used as a polymer solution B.

Comparative Example 6

A composite semipermeable membrane according to Comparative Example 6 was obtained in the same manner as in Example 1, except that a DMF solution having a polysulfone concentration of 20% by weight was used as a polymer solution A and a DMF solution having a polysulfone concentration of 18% by weight was used as a polymer solution B.

Comparative Example 7

A porous supporting membrane was obtained in the same manner as in Comparative Example 1, except that a DMF solution having a polysulfone concentration of 18% by weight was used as a polymer solution A.

An aqueous solution containing 3.0% by weight of m-PDA, 0.15% by weight of sodium lauryl sulfate, 3.0% by weight of triethylamine, and 6.0% by weight of camphorsulfonic acid was applied on the porous supporting membrane obtained. After the membrane was allowed to stand still for 1 minute, the membrane surface was held vertically for 2 minutes to remove the excess solution from the membrane, and nitrogen was blown thereagainst from an air nozzle to remove the excess aqueous solution from the surface of the porous supporting membrane. Thereafter, a 25° C. hexane solution containing 0.20% by weight of trimesoyl chloride was applied thereto so that the membrane surface was completely wetted. After this membrane was allowed to stand still for 1 minute, the membrane surface was held vertically for 1 minute to remove the excess solution from the membrane. Thereafter, this membrane was held in a 120° C. hot-air drying oven for 3 minutes to form a separation functional layer. Thus, a composite semipermeable membrane according to Comparative Example 7 was obtained.

Comparative Example 8

A porous supporting membrane was obtained in the same manner as in Comparative Example 1, except that a DMF solution having a polysulfone concentration of 17% by weight was used as a polymer solution A.

An aqueous solution containing 3.0% by weight of m-PDA was applied on the porous supporting membrane obtained. After the membrane was allowed to stand still for 1 minute, the membrane surface was held vertically for 2 minutes to remove the excess solution from the membrane, and nitrogen was blown thereagainst from an air nozzle to remove the excess aqueous solution from the surface of the porous supporting membrane. Thereafter, a 25° C. Isopar L (available from Exxon Mobil Corp.) solution containing 0.13% by weight of trimesoyl chloride was sprayed thereon so that the membrane surface was completely wetted. After the membrane was allowed to stand still for 1 minute, the membrane surface was held vertically for 1 minute to remove the excess solution from the membrane. Thereafter, the membrane was subjected to cleaning with room-temperature water. Thus, a composite semipermeable membrane according to Comparative Example 8 was obtained.

Comparative Example 9

A DMF solution having a polysulfone concentration of 15% by weight was applied as a polymer solution A to a nonwoven fabric in a thickness of 110 µm. A porous supporting membrane equipped with a single-layer porous supporting layer was obtained therefrom by subsequently conducting the same procedure as in Comparative Example 1. A DMF solution having a polysulfone concentration of 25% by weight was applied as a polymer solution B at a thickness of 50 µm on the porous supporting layer thus obtained, and the coated membrane was treated by performing the same procedure as in Comparative Example 1 again. Thus, a porous supporting layer composed of two layers was formed. Namely, the first and second layers included in this porous supporting layer were formed through not simultaneous but consecutive application and coagulation.

A separation functional layer was formed on the thus-obtained porous supporting membrane equipped with the porous supporting layer composed of two layers, in the same manner as in Example 1. Thus, a composite semipermeable membrane according to Comparative Example 9 was obtained.

Measurement of Porosity of the Porous Supporting Layers

With respect to a sample of the porous supporting layer of each composite semipermeable membrane obtained, $\Phi_0$ and $\Phi_2$ were determined by the method described above and $\Phi_1$ was calculated therefrom.

Determination of Number Density and Height of Projections and Standard Deviation A sample of a composite semipermeable membrane was embedded in an epoxy resin and stained with $OsO_4$ to facilitate cross-section examination. This sample was cut with an ultramicrotome to produce ten ultrathin sections. With respect to the ultrathin sections obtained, photographs of the cross-sections were taken using a transmission electron microscope. The accelerating voltage during the examination was 100 kV, and the magnification was 10,000 times.

With respect to each cross-section photograph obtained, the height of projections present in a width of 2.0 µm in the direction of the surface of the porous supporting membrane was measured with a scale, and a 10-point average surface roughness was calculated by the method described above. Based on this 10-point average surface roughness, portions having a height of one-fifth or more of the 10-point average surface roughness were taken as projections. The number thereof was counted, and the average number density of projections of the separation functional layer was determined. Furthermore, the heights of all the projections in the cross-section photographs were measured with a scale, and the average height of the projections was determined and a standard deviation was calculated.

Separation Functional Layer Hardness Test

The substrate was peeled from a composite semipermeable membrane and the remaining membrane was immersed in DMF solution to dissolve away the components of the porous supporting membrane to obtain the separation functional layer. The separation functional layer obtained was placed, in a spread state, on a silicon wafer and fixed thereto to obtain a sample of the separation functional layer. The separation functional layer sample produced was subjected to a hardness test according to a nanoindentation method. The specific procedure of the method is shown below.

A Berkovich indenter having the shape of a regular trigonal pyramid (made of diamond, angle between ridges: 115°, radius of curvature of indenter tip: 20 nm) was vertically forced into any ten portions of the separation functional layer of the sample to a depth of 50 nm, and the resultant load was measured with Nanoindenter DCM, manufactured by MTS Systems Corp. The values obtained were averaged to determine an average load. The measurement was made at room temperature.

Salt-Removing Ability (TDS Rejection), Start/Stop Test

An aqueous solution having an NaCl concentration of 3.5% by weight, a temperature of 25° C., and a pH of 6.5 was supplied to each composite semipermeable membrane at an operation pressure of 5.5 MPa to thereby perform a water treatment operation over 24 hours. Subsequently, permeate obtained at an operation pressure of 5.5 MPa was used to determine the salt-removing ability. Thereafter, 5,000 cycles of a filtration treatment with the composite semipermeable membrane were repeatedly conducted, each cycle including holding the composite semipermeable membrane for 1 minute at an operation pressure of 5.5 MPa, subsequently lowering the pressure to 0 MPa over 30 seconds, thereafter maintaining the pressure for 1 minute, and then elevating the pressure to 5.5 MPa over 30 seconds. Subsequently, the salt-removing ability was determined.

The operation pressure during the examination for determining the salt-removing ability was 5.5 MPa or 4.0 MPa. The other conditions were the same as in the cycling operation. Each permeate obtained was used to determine the salt-removing ability.

The electrical conductivity of the feed water and that of the permeate were measured with a conductance meter manufactured by Toa Denpa Kogyo Co., Ltd., thereby obtaining the practical salinity. The salt-removing ability, i.e., TDS rejection, was determined from a TDS concentration obtained by converting the practical salinity, using the following equation:

TDS rejection (%)=100×{1−[(TDS concentration in permeate)/(TDS concentration in feed water)]}.

Membrane Permeation Flux

The amount of permeate obtained by the filtration treatment conducted for 24 hours was converted to water permeability ($m^3$) per day per square meter of the membrane surface, and expressed as membrane permeation flux ($m^3/m^2$/day).

The results of the above tests are shown in Tables 1 to 3. It can be seen from Examples 1 to 7 that our composite semipermeable membranes have high water permeability and salt-removing ability and are excellent in terms of retentivity of these performances under such operation conditions that operation and stopping are frequently repeated and the pressure fluctuates.

TABLE 1

| | Porous supporting layer | | | | | |
|---|---|---|---|---|---|---|
| | First layer (polymer solution A) | | Second layer (polymer solution B) | | Porosity | |
| | Solvent | Polymer concentration a (wt %) | Solvent | Polymer concentration b (wt %) | $\phi_1$ | $\phi_2$ |
| Example 1 | DMF | 15 | DMF | 25 | 0.31 | 0.74 |
| Example 2 | DMF | 18 | DMF | 25 | 0.31 | 0.70 |
| Example 3 | DMF | 15 | DMF | 28 | 0.29 | 0.73 |
| Example 4 | DMF | 15 | DMF | 30 | 0.34 | 0.75 |
| Example 5 | NMP | 15 | NMP | 25 | 0.34 | 0.74 |
| Example 6 | DMF | 18 | DMF | 20 | 0.34 | 0.70 |
| Example 7 | DMF | 15 | DMF | 25 | 0.31 | 0.73 |
| Comp. Ex. 1 | DMF | 25 | — | — | 0.31 | 0.62 |
| Comp. Ex. 2 | DMF | 15 | — | — | 0.37 | 0.75 |
| Comp. Ex. 3 | NMP | 15 | — | — | 0.37 | 0.74 |
| Comp. Ex. 4 | DMF | 13 | DMF | 20 | 0.34 | 0.76 |
| Comp. Ex. 5 | DMF | 25 | DMF | 15 | 0.37 | 0.63 |
| Comp. Ex. 6 | DMF | 20 | DMF | 18 | 0.35 | 0.68 |
| Comp. Ex. 7 | DMF | 18 | — | — | 0.35 | 0.71 |
| Comp. Ex. 8 | DMF | 17 | — | — | 0.36 | 0.72 |
| Comp. Ex. 9 | DMF | 15 | DMF | 25 | 0.31 | 0.56 |

TABLE 2

| | Separation functional layer | | | | |
|---|---|---|---|---|---|
| | Number density of projections (projections/μm) | Height of Projections (nm) | Standard deviation (nm) | Amine/acid halide ratio (—) | Hardness of projections (μN) |
| Example 1 | 15.0 | 89 | 65 | 1.68 | 0.65 |
| Example 2 | 13.9 | 78 | 75 | 1.63 | 0.59 |
| Example 3 | 18.9 | 79 | 61 | 1.77 | 0.82 |
| Example 4 | 22.3 | 73 | 50 | 1.83 | 0.85 |
| Example 5 | 14.6 | 86 | 83 | 1.69 | 0.60 |
| Example 6 | 12.4 | 97 | 82 | 1.64 | 0.55 |
| Example 7 | 15.6 | 74 | 69 | 1.67 | 0.62 |
| Comp. Ex. 1 | 12.2 | 55 | 54 | 1.31 | 0.47 |
| Comp. Ex. 2 | 9.6 | 103 | 89 | 1.5 | 0.45 |
| Comp. Ex. 3 | 9.5 | 102 | 89 | 1.43 | 0.43 |
| Comp. Ex. 4 | 12.2 | 140 | 86 | 1.53 | 0.38 |
| Comp. Ex. 5 | 7.2 | 70 | 79 | 1.52 | 0.49 |
| Comp. Ex. 6 | 9.8 | 95 | 93 | 1.57 | 0.44 |
| Comp. Ex. 7 | 10.8 | 102 | 95 | 1.34 | 0.38 |
| Comp. Ex. 8 | 11.0 | 95 | 92 | 1.34 | 0.35 |
| Comp. Ex. 9 | 6.8 | 77 | 90 | 1.56 | 0.48 |

TABLE 3

| | Performance of composite semipermeable membrane (after 24-h operation at 5.5 MPa; evaluation pressure, 5.5 MPa) | | Performance of composite semipermeable membrane (after start/stop test; evaluation pressure, 5.5 MPa) | | Performance of composite semipermeable membrane (after start/stop test; evaluation pressure, 4.0 MPa) | |
|---|---|---|---|---|---|---|
| | TDS rejection (%) | Permeation flux (m³/m²/day) | TDS rejection (%) | Permeation flux (m³/m²/day) | TDS rejection (%) | Permeation flux (m³/m²/day) |
| Example 1 | 99.71 | 1.11 | 99.73 | 1.00 | 99.68 | 0.62 |
| Example 2 | 99.79 | 1.03 | 99.80 | 0.93 | 99.75 | 0.58 |
| Example 3 | 99.70 | 1.24 | 99.72 | 1.14 | 99.67 | 0.71 |
| Example 4 | 99.85 | 1.60 | 99.85 | 1.52 | 99.80 | 1.01 |
| Example 5 | 99.70 | 1.06 | 99.68 | 0.95 | 99.63 | 0.60 |
| Example 6 | 99.68 | 1.00 | 99.60 | 0.85 | 99.55 | 0.53 |
| Example 7 | 99.65 | 1.02 | 99.60 | 0.90 | 99.55 | 0.56 |
| Comp. Ex. 1 | 99.85 | 0.50 | 99.88 | 0.43 | 99.83 | 0.27 |
| Comp. Ex. 2 | 99.66 | 1.02 | 99.70 | 0.82 | 99.65 | 0.51 |
| Comp. Ex. 3 | 99.60 | 0.98 | 99.60 | 0.78 | 99.55 | 0.49 |
| Comp. Ex. 4 | 99.85 | 1.68 | 99.50 | 1.29 | 99.45 | 0.81 |
| Comp. Ex. 5 | 99.25 | 0.63 | 99.10 | 0.50 | 99.05 | 0.32 |
| Comp. Ex. 6 | 99.54 | 0.84 | 99.50 | 0.69 | 99.45 | 0.43 |
| Comp. Ex. 7 | 99.71 | 0.79 | 99.68 | 0.69 | 99.63 | 0.43 |
| Comp. Ex. 8 | 99.50 | 0.96 | 99.61 | 0.78 | 99.56 | 0.49 |
| Comp. Ex. 9 | 99.68 | 0.40 | 99.65 | 0.36 | 99.60 | 0.23 |

While our membranes have been described in detail and with reference to specific examples thereof, it will be apparent to one skilled in the art that various changes and modifications can be made therein without departing from the spirit and scope thereof.

INDUSTRIAL APPLICABILITY

The composite semipermeable membrane is suitable especially for the desalination of seawater or brackish water.

The invention claimed is:

1. A composite semipermeable membrane comprising: a porous supporting membrane having a substrate and a porous supporting layer disposed on the substrate; and a separation functional layer which has projections and is disposed on the porous supporting membrane,
    wherein the separation functional layer is a polyamide obtained by polycondensation of a polyfunctional amine with a polyfunctional acid halide, and the polyamide is constituted of units of the polyfunctional amine and units of the polyfunctional acid halide,
    the porous supporting layer having a multilayer structure formed by simultaneously applying a polymer solution A to form a first layer and a polymer solution B to form a second layer to the substrate, followed by contacting with a coagulation bath to cause phase separation, the polymer solution A having a solid concentration a of 12% to 18% by weight and the polymer solution B having a solid concentration b of 14% to 35% by weight, such that a/b≤1.0,
    wherein the polymer material in polymer solution A and the polymer material in polymer solution B are each independently selected from the group consisting of polysulfones, polyethersulfones, polyamides, polyesters, cellulosic polymers, vinyl polymers, poly(phenylene sulfide), poly(phenylene sulfone), and poly(phenylene oxide), or blends thereof,
    wherein the solvent of the polymer solution A and the solvent of polymer solution B are each good solvents independently selected from the group consisting of N-methyl-2-pyrrolidone, tetrahydrofuran, dimethyl sulfoxide, an amide, tetramethylurea, dimethylacetamide, dimethylformamide, a lower-alkyl ketone, acetone, methyl ethyl ketone, an ester, a lactone, trimethyl phosphate, y-butyrolactone, and mixed solvents thereof,
    wherein, as examined using an electron microscope, any ten cross-sectional images of the composite semipermeable membrane, each having a width of 2.0 μm in a membrane surface direction, have an average number density of projections having a height of one-fifth or more of a 10-point average surface roughness of the separation functional layer of 10.0 to 30.0 projections/μm, and the projections have an average height of less than 100 nm,
    the composite semipermeable membrane has a water production rate of 1.0 m³/m²/day or higher and a salt rejection of 99.5% or higher after an aqueous solution having an NaCl concentration of 3.5% by weight, a temperature of 25° C., and a pH of 6.5 is passed through the composite semipermeable membrane at a pressure of 5.5 MPa for 24 hours,
    wherein when an average thickness of the porous supporting layer is expressed by d, an average porosity of a portion of the porous supporting layer which is 0 to 0.1 d in terms of a distance from an interface between the porous supporting layer and the separation functional layer is expressed by $\Phi_1$, and an average porosity of a portion of the porous supporting layer which is 0.1 d to d in terms of said distance is expressed by $\Phi_2$, then $\Phi_1 < 0.35$ and $\Phi_2 > 0.70$.

2. The composite semipermeable membrane according to claim 1, wherein the average number density is 13.0 to 30.0 projections/μm.

3. The composite semipermeable membrane according to claim 1, wherein the projections in each of the cross-sections have a standard deviation of height of 70 nm or less.

4. The composite semipermeable membrane according to claim 1, wherein the porous supporting layer has a multilayer structure including a first layer disposed on a substrate side and a second layer formed thereon.

5. The composite semipermeable membrane according to claim 4, wherein an interface between the first layer and the second layer has a continuous structure.

6. The composite semipermeable membrane according to claim 1, wherein the polymer solution A and the polymer solution B are different from each other in composition.

7. The composite semipermeable membrane according to claim 1, wherein the substrate of the porous supporting membrane is a long-fiber nonwoven fabric comprising a polyester.

8. The composite semipermeable membrane according to claim 1, wherein the polyamide is constituted of units of the polyfunctional amine and units of the polyfunctional acid halide in a presence ratio represented by:

(Number of moles of the units of the polyfunctional amine)/(number of moles of the units of the polyfunctional acid halide)≥1.6.

9. The composite semipermeable membrane according to claim 1, wherein, when an indenter is forced into the any ten sites of the separation functional layer in a hardness test according to a nanoindentation method to result in a displacement of 50 nm, the ten sites have an average load of 0.50 µN or greater.

10. The composite semipermeable membrane according to claim 9, wherein the average load is 1.00 µN or greater.

11. The composite semipermeable membrane according to claim 1, which, after having been subjected over 24 hours to a filtration treatment in which an aqueous solution having an NaCl concentration of 3.5% by weight, a temperature of 25° C., and a pH of 6.5 is supplied to the composite semipermeable membrane at an operation pressure of 5.5 MPa and thereafter subjected repeatedly to 5,000 cycles of a filtration treatment with the composite semipermeable membrane, each cycle comprising holding for 1 minute at an operation pressure of 5.5 MPa, subsequently lowering the pressure to 0 MPa over 30 seconds, thereafter maintaining the pressure for 1 minute, and then elevating the pressure to 5.5 MPa over 30 seconds, has a water production rate of 1.00 m$^3$/m$^2$/day or higher and a salt rejection of 99.80% or higher when the aqueous solution is passed through the composite semipermeable membrane at an operation pressure of 4.0 MPa.

* * * * *